(12) United States Patent
Jelinek

(10) Patent No.: US 7,279,804 B2
(45) Date of Patent: Oct. 9, 2007

(54) AC POWER INTERLOCK SYSTEM FOR MOTOR HOMES

(75) Inventor: Howard J. Jelinek, Laguna Beach, CA (US)

(73) Assignee: Girard Systems, San Clemente, CA (US)

( * ) Notice: Subject to any disclaimer, the term of this patent is extended or adjusted under 35 U.S.C. 154(b) by 466 days.

(21) Appl. No.: 11/013,848

(22) Filed: Dec. 16, 2004

(65) Prior Publication Data

US 2006/0144635 A1    Jul. 6, 2006

(51) Int. Cl.
*B60L 1/00*    (2006.01)

(52) U.S. Cl. ...................................................... 307/10.1

(58) Field of Classification Search ................ 307/10.1
See application file for complete search history.

*Primary Examiner*—Robert L. Deberadinis
(74) *Attorney, Agent, or Firm*—Walter A. Hackler

(57) ABSTRACT

An AC power system for recreational vehicle includes an input circuit for receiving alternating current and at least one output circuit providing alternating current to devices. A park brake circuit is provided for producing a vehicle brake signal, deactivation signal, and an ignition circuit provides a vehicle engine ignition signal. An interlock provides for disabling the output circuit in response to at least one of the brake signal and ignition signals.

11 Claims, 3 Drawing Sheets

AC POWER INTERLOCK SYSTEM FOR MOTOR HOMES

Recreational vehicles and motor homes may be supplied with three different power sources, namely a landline, which is connected to the recreational vehicle with 120 volt AC power, a motor generator which is carried by the vehicle, and an inverter which converts the 12-volt DC vehicle battery power to 110 volt AC power.

Often, the recreational vehicles and motor home relies the 120-volt AC power for a number of applications including exterior awnings, electric doors, electric shades, air conditioning, and powered patio extensions.

It should be clear that many, if not all, of these accessories are restricted to use when the vehicle is parked, i.e. a stationary condition.

The present invention provides for an alternating current power interlock (ACPI) for providing a disablement of 120-volt AC circuit when recreational vehicles or motor homes are about to be moved and moving. A disablement of 12-volt circuits may also be enabled.

SUMMARY OF THE INVENTION

An AC power system in accordance with the present invention for a recreational vehicle generally includes an input circuit receiving alternating current and at least one output circuit providing alternating current voltage. The output circuit may be utilized for exterior awnings, electric doors, electric shades, air conditioning, and powered patio extensions, as hereinabove noted.

Park brake circuitry provides a brake signal deactivation signal upon parking brake deactivation. Ignition circuitry provides an ignition signal when the vehicle engine ignition is activated.

Interlock circuitry, in accordance with the present invention, interconnected with the hereinabove referenced circuitry disables the AC power output circuit in response to at least one of the brake signals and/or the ignition signal.

The system may include a plurality of output circuits and a plurality of input circuits with the park brake circuitry and ignition circuitry along with the interlock circuitry operating in a manner hereinabove noted. Additional interlocks may be applied such as door switches, pressure switches, security sensor switches and the like.

In addition, a switch circuit may be provided which temporarily disables the output circuit and thereafter restores the output circuit, as will be hereinafter described in greater detail.

The interlock circuitry may also include a circuit disabling the output circuit in response to a combination of the brake signal and ignition signal.

The input circuitry may provide an AC signal upon interruption of alternating current receipt and the interlock circuitry may include circuitry to delay the enabling of the output circuit in response to an absence of the AC signal.

BRIEF DESCRIPTION OF THE DRAWINGS

The present invention may be more clearly appreciated when taken in conjunction with the accompanying drawings in which.

DETAILED DESCRIPTION

Figure 1A:
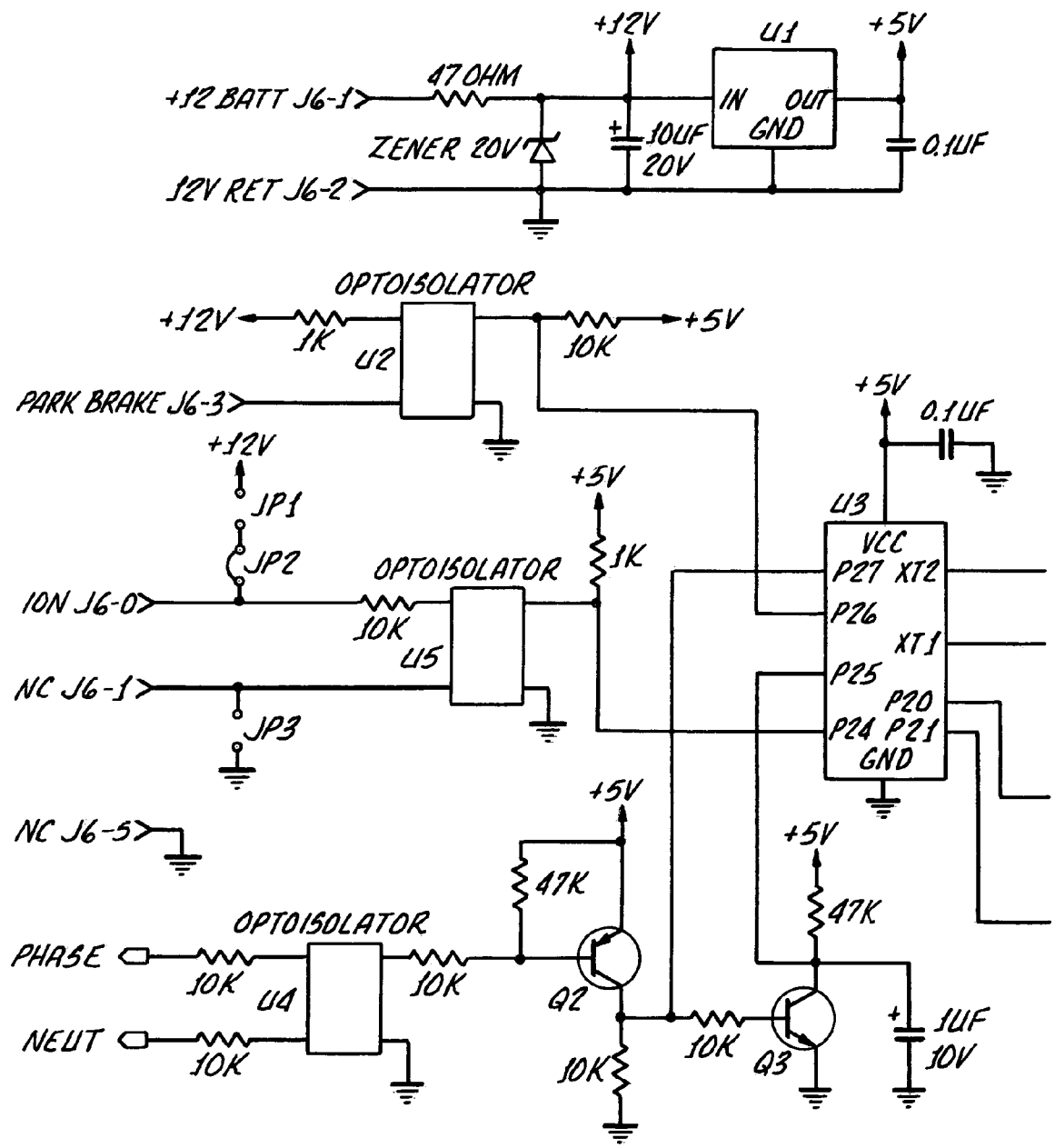
FIGS. 1A and 1B in combination provide a schematic drawing of the AC power system in accordance with the present invention.
Figure 1B:
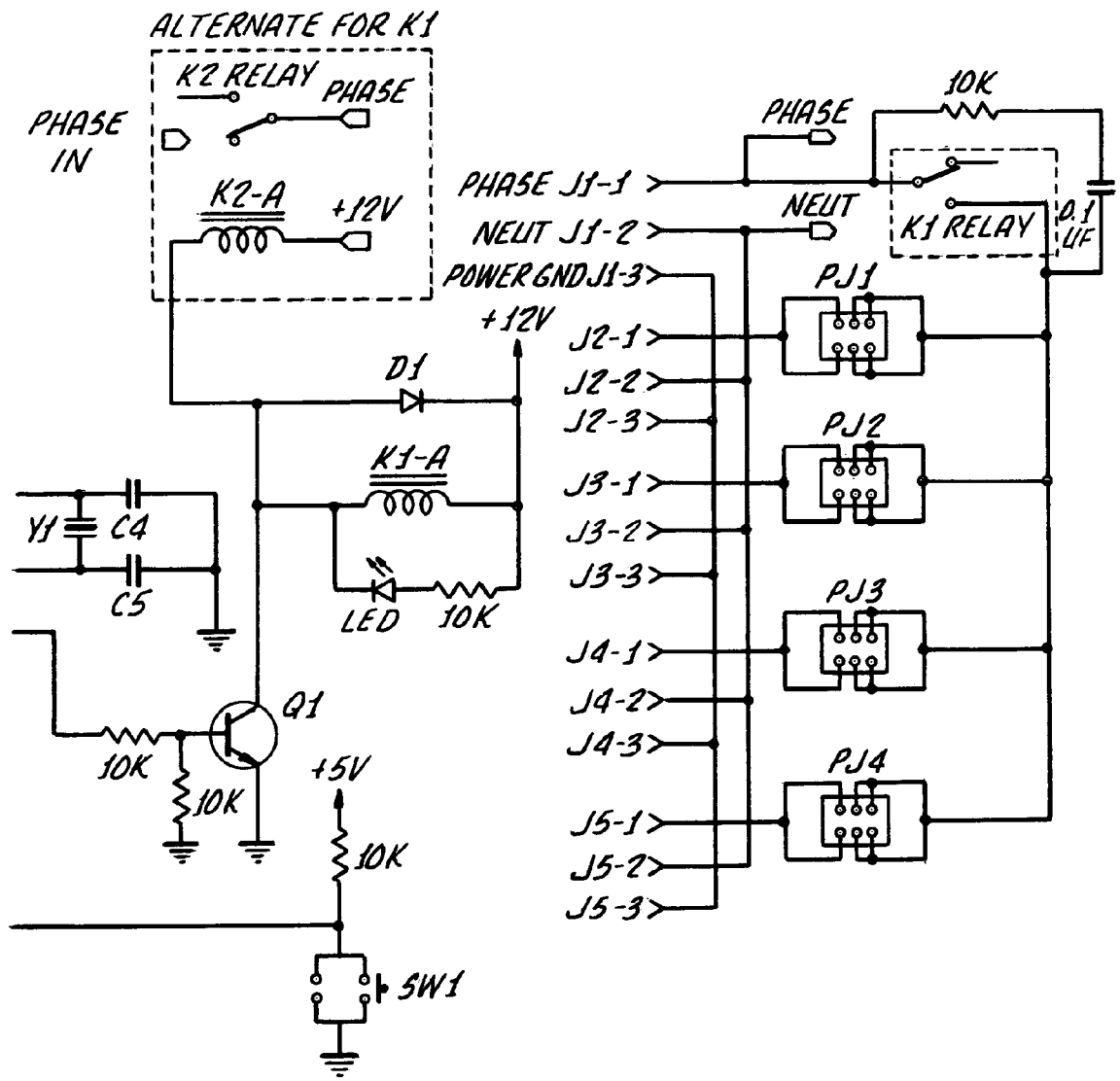
Figure 2:
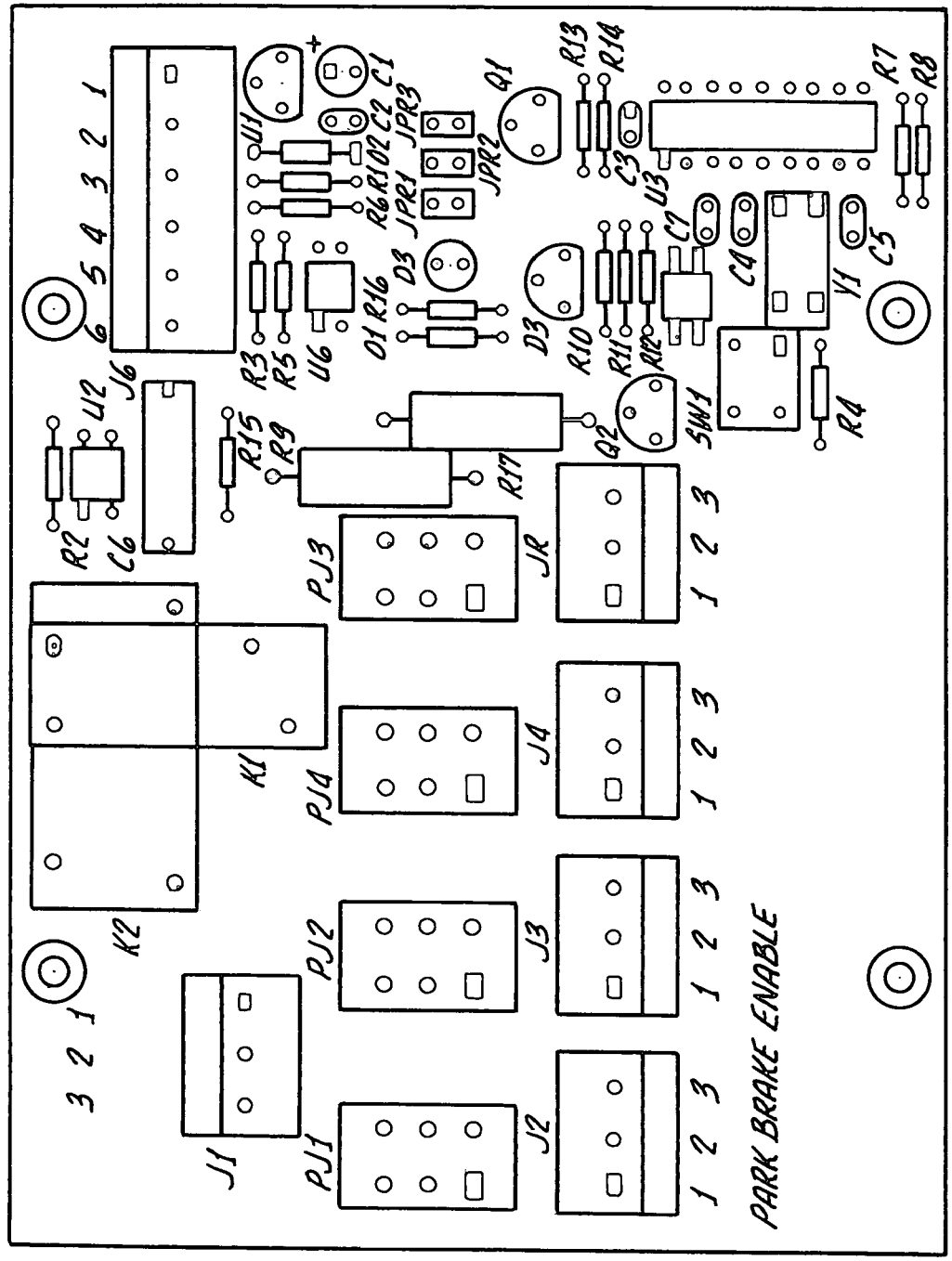
FIG. 2 is a block diagram of a connector panel illustrating input and output corresponding to the schematic diagram, as shown in FIGS. 1A and 1B.

An AC powered interlock system 10 in accordance with the present invention is shown schematically in FIGS. 1A, 1B and FIG. 2 illustrates a block diagram of connections thereto.

The system 10 prevents AC accessory operation when the vehicle is moving or when the AC power is interrupted. This is mandatory since many accessories (not shown) are controlled by wall switches or hand held rf remotes (not shown) that are accessible from the interior of the coach. For safety purposes, it is mandatory to prevent accidental or unwanted operation the switches or remote controls when the vehicle is in motion. The AC interlock system 10 in accordance with the present invention provides a safety interlock and prevents inadvertent operation of the AC accessories in unsafe conditions.

As shown in FIGS. 1A, 1B, the ACPI 10 is a "smart power switch" that has a single 120-volt input and four 120-volt outputs. There is a switch that may be electromechanical or electrical that interrupts the phase lead whenever the coach is in motion. It provides a way to disable 120-volt AC circuits in motor homes when the vehicle is in an unsafe condition. This system is also usable for 240-volt AC or DC. A two pole switch may be used to interrupt both phase and neutral power wires.

The basic unit contains a three-pin AC power connector with phase, neutral, and ground output. This input circuit is from the inverter or AC distribution panel.

Depending on the current carrying capacity of the switching the ACPI 10 example output circuits are each capable of 3 or 5 amps. These circuits typically go to awning motors but may be used for any of the AC circuits that must be protected from being used when the vehicle is in an unsafe condition.

Current generation environmental control units (awnings, shades, blinds) (not shown) are provided with remote controls that operate the units from a hand set. The ACPI 10 will disable AC power and therefore render the remote control inoperative when the vehicle is moving. This safety feature can be offered on any device that is AC powered.

There are four low level input and signal wires identified as +12 volts, (+12 Volt) ground, ignition, and park brake. These signals are commonly available on a recreational vehicle and may be obtained directly or indirectly from the vehicle. Three conditions are identified which will interrupt the AC input: ignition on, park brake off, or AC power intermittent. So, for example, if the ignition switch is on, or if the park brake is disengaged, the AC will be interrupted and any motor or other device on any one of the four output circuits will be rendered inoperative. If the vehicle driver decides to use the park brake only as an interlock and does not hook up the ignition, then the power will be disabled only if the park brake is disengaged. A similar condition exists if the ignition input is used and the park brake is not hooked up.

Once all of the conditions: park brake engaged, ignition is off, and the AC power is stable, the 120-volt AC input will be switched onto the (four) output circuits after a delay of approximately (20) seconds. This time may be changed to suit the required conditions.

The above description refers to a power control circuit that has one input and several outputs. It is possible to have almost any number of input and output circuit combinations.

The description defines a low cost version that requires only one relay or equivalent (AC) interpreter.

An important feature of the above circuit is that all of the conditions must be stable for N seconds before the AC power is switched. Another feature is the capability to switch the power at the zero crossing point. Although this is a well-known technique to prevent large switching currents from being switched by the relay or its equivalent, using this provides greater reliability and less stress on the AC switching components.

The AC input wiring is connected to J1 and the AC circuits to motors are on J2, J3, J4, and J5. There are three wires per circuit. For the AC to be switched on, the ignition must be off and the park brake must be engaged. If these conditions are met, then the AC J1 will be connected to J2, J3, J4, and J5 after the conditions are stable for (20) seconds. If a remote control is available, it will operate the motors used in the awnings or shades. If for any reason the AC should be momentarily interrupted, the phase wire of the input will be disconnected from the outputs and remain disconnected until the AC is stable.

If the unit is used for rf motors, (motors with built-in rf controls) it may be used to separately reprogram motors to accept the rf channel(s). This is done using the four phase interrupt switches, PJ1, PJ2, PJ3, and PJ4. For example, if the motor connected to the circuit on J1 needs to be reprogrammed, PJ1 is set "on" and switch SW1 is depressed and switches PJ2, PJ3, and PJ4 are set to off. This must be done within one minute of pressing SW1. When SW1 is pressed a second time, the power on J1 will be cycled and the motor will be reset. If the switch is not pressed within the minute, the system will revert to normal operation. SW1 provides a way to interrupt the AC for one minute if pressed only once not more often than every two minutes. The LED (D3) will indicate whenever the AC is active.

Modes of Operation
1. Disable AC on deactivation of park brake.
2. Disable AC on activation of ignition.
3. Disable AC for twenty seconds on momentary "glitch" of AC.
4. Allow AC "program cycle" when SW1 pushed once. If pushed again within one minute, AC will perform "program cycle" and stay on.

Although there has been hereinabove described a specific AC power interlock system for homes in accordance with the present invention for the purpose of illustrating the manner in which the invention may be used to advantage, it should be appreciated that the invention is not limited thereto. That it is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. An AC power interrupter for a recreational vehicle, the system comprising:
   an input circuit receiving alternating current;
   at least one output circuit providing alternating current;
   park brake circuitry providing a vehicle brake signal deactivation signal;
   ignition circuitry providing a vehicle engine ignition signal;
   interlock circuitry disabling the output circuit in response to at least one of the brake signal and the ignition signal.

2. The system according to claim 1 further comprises a plurality of output circuits.

3. The system according to claim 1 further comprises a plurality of input circuits.

4. The system according to claim 1 further comprising a switch circuit temporarily disabling the output circuit and thereafter restoring the output circuit.

5. The system according to claim 1 wherein said interlock circuitry includes a circuit disabling the output circuit in response to both the brake signal and the ignition signals.

6. An AC power system for a recreational vehicle, the system comprising:
   an input circuit receiving alternating circuit and producing an AC signal upon interruption of alternating circuit receipt;
   an output circuit providing alternating current;
   park brake circuitry providing a brake signal on deactivation of a vehicle park brake;
   ignition circuitry providing an ignition signal on activation of a vehicle engine ignition; and
   interlock circuitry disabling the output circuit in response to at least one of the AC signal, the park brake signal and the ignition signal.

7. The system according to claim 6 wherein said interlock circuitry includes circuitry enabling the output circuit in response to an absence of the AC signal.

8. The system according to claim 6 further comprising a plurality of output circuits.

9. The system according to claim 6 further comprising a plurality of input circuits.

10. The system according to claim 6 further comprising a switch circuit temporarily disabling the output circuit and thereafter restoring the output circuit.

11. The system according to claim 6 wherein said interlock circuitry includes a circuit disabling the output circuit in response to both the brake signal and the ignition signals.

* * * * *